United States Patent [19]
Leng

[11] Patent Number: 5,644,953
[45] Date of Patent: Jul. 8, 1997

[54] CRANK ASSEMBLY FOR A BICYCLE

[75] Inventor: Tony Leng, Nan-Tou City, Taiwan

[73] Assignee: Cyclone Precision, Inc., Taiwan

[21] Appl. No.: 527,340

[22] Filed: Sep. 12, 1995

[51] Int. Cl.[6] .................................................. G05G 1/14
[52] U.S. Cl. ............................. 74/594.2; 74/594.1
[58] Field of Search ........................... 74/594.1–594.3

[56] References Cited

U.S. PATENT DOCUMENTS

| | | | |
|---|---|---|---|
| 4,201,120 | 5/1980 | Segawa | 74/594.2 |
| 4,630,503 | 12/1986 | Liu | 74/594.2 |
| 4,704,919 | 11/1987 | Durham | 74/594.1 |
| 5,062,318 | 11/1991 | Yamazaki | 74/594.2 |
| 5,179,873 | 1/1993 | Girvin | 74/594.2 X |
| 5,197,353 | 3/1993 | Trenerry et al. | 74/594.1 |
| 5,242,028 | 9/1993 | Murphy et al. | 74/594.2 X |
| 5,435,869 | 7/1995 | Christensen | 74/594.1 X |

FOREIGN PATENT DOCUMENTS

| | | | |
|---|---|---|---|
| 861561 | 2/1941 | France | 74/594.1 |
| 643288 | 9/1950 | United Kingdom | 74/594.2 |
| 2225296 | 5/1990 | United Kingdom | 74/594.1 |

Primary Examiner—Vinh T. Luong
Attorney, Agent, or Firm—Welsh & Katz, Ltd.

[57] ABSTRACT

A crank assembly for a bicycle includes a drive plate and an elongated crank arm which are separately formed. The bicycle includes a sprocket with a fixed rotating shaft of a rectangular cross-section. The drive plate has an internal peripheral wall that defines a shaft hole, an inward flange that projects from the inner peripheral wall into the shaft hole in such a manner that the shaft extends through the shaft hole, and several angularly equidistant through-holes around the shaft hole. The crank arm has an end portion with a fastener hole, an annular flange portion which projects horizontally from the end portion and which has a vertical abutting face that abuts on the inward flange of the drive plate, and a rectangular receiving space formed through the flange portion to form a portion of the fastener hole and to receive the shaft. The fastener hole has an outer section with a shape different from that of the rectangular receiving space. The annular flange portion of the crank arm is fitted within the shaft hole. Several locking bolts extend through the through-holes of the drive plate to engage threadably within the threaded holes of the crank arm, so as to fasten together the drive plate and the crank arm.

1 Claim, 3 Drawing Sheets

CRANK ASSEMBLY FOR A BICYCLE

BACKGROUND OF THE INVENTION

1. Field of the Invention

The invention relates to a crank assembly, more particularly to a crank assembly for a bicycle.

2. Description of the Related Art

Referring to FIG. 1, a conventional crank assembly for a bicycle is shown to comprise a drive plate 11 with through-holes formed therethrough, and an elongated crank arm 10 which has an upper end portion formed integrally with the drive plate 11, and a lower end portion formed with a threaded hole 13 in which a pedal of the bicycle is mounted. The drive plate 11 has a central hole of rectangular cross section which permits the fixed rotating shaft 12 of a sprocket 1 of the bicycle to extend therethrough in such a manner that the drive plate 11 can rotate synchronously with the sprocket 1. A plurality of screws 111 are inserted through the though-holes of the drive plate 11 so as to be threaded in the threaded holes of the drive plate 11 and the sprocket 1, thereby completing assembly of the conventional crank assembly on the sprocket 1. When the pedal is actuated, the sprocket 1 rotates to drive the bicycle.

Note that it is difficult to produce the conventional crank assembly as a unitary piece due to the complicated structure thereof. The conventional crank assembly is made of aluminum alloy. Since the mold, which is used in the formation of the conventional crank assembly, has a plurality of intercommunicated cavities, bubbles of air are often entrapped within the aluminum alloy during the molding operation, thereby resulting in uneven outer surfaces of the conventional crank assembly and correspondingly, in poor quality thereof.

SUMMARY OF THE INVENTION

The main object of the present invention is to provide a crank assembly for a bicycle which is easy to manufacture and which is free from the above mentioned drawbacks.

Accordingly, a crank assembly for a bicycle of the present invention includes a drive plate and an elongated crank arm which are separately formed. The bicycle includes a sprocket with a fixed rotating shaft of a rectangular cross-section. The drive plate is adapted to be fixed to the sprocket so as to achieve synchronous rotation therewith, and has an internal peripheral wall that defines a shaft hole of a predetermined shape therein, an inward flange that projects from the inner peripheral wall into the shaft hole in such a manner that the shaft of the sprocket extends through the shaft hole of the drive plate, and several angularly equidistant through-holes formed through the drive plate around the shaft hole. The crank arm has an end portion with a fastener hole formed therethrough, an annular flange portion which projects horizontally from a side surface of the end portion and which has a vertical abutting face which abuts on the inward flange of the drive plate, and a rectangular receiving space formed through the flange portion so as to form a portion of the fastener hole and so as to receive the shaft of the sprocket therein. The fastener hole of the crank arm further has an outer section which has a cross-section with a shape different from that of the rectangular receiving space. The crank arm further has several threaded holes formed in a surface of the end portion around the flange portion. Several locking bolts extend through the through-holes of the drive plate and engage threadably the threaded holes of the crank arm so as to fasten together the drive plate and the crank arm. In use, the rotating shaft of the sprocket extends into the rectangular receiving space of the flange portion of the crank arm through the shaft hole of the drive plate so as to engage threadably a threaded fastener which is received within the outer section of the fastener hole of the crank arm, thereby securing the crank assembly to the sprocket, in such a manner that the crank assembly can rotate synchronously with the sprocket.

Since the drive plate and the crank arm of the crank assembly of the present invention are separately formed, the crank assembly can be easily mounted on the sprocket of the bicycle.

BRIEF DESCRIPTION OF THE DRAWINGS

Other features and advantages of the present invention will become more apparent in the following detailed description of the preferred embodiment with reference to the accompanying drawings, in which.

DETAILED DESCRIPTION OF THE PREFERRED EMBODIMENT

Figure 1:
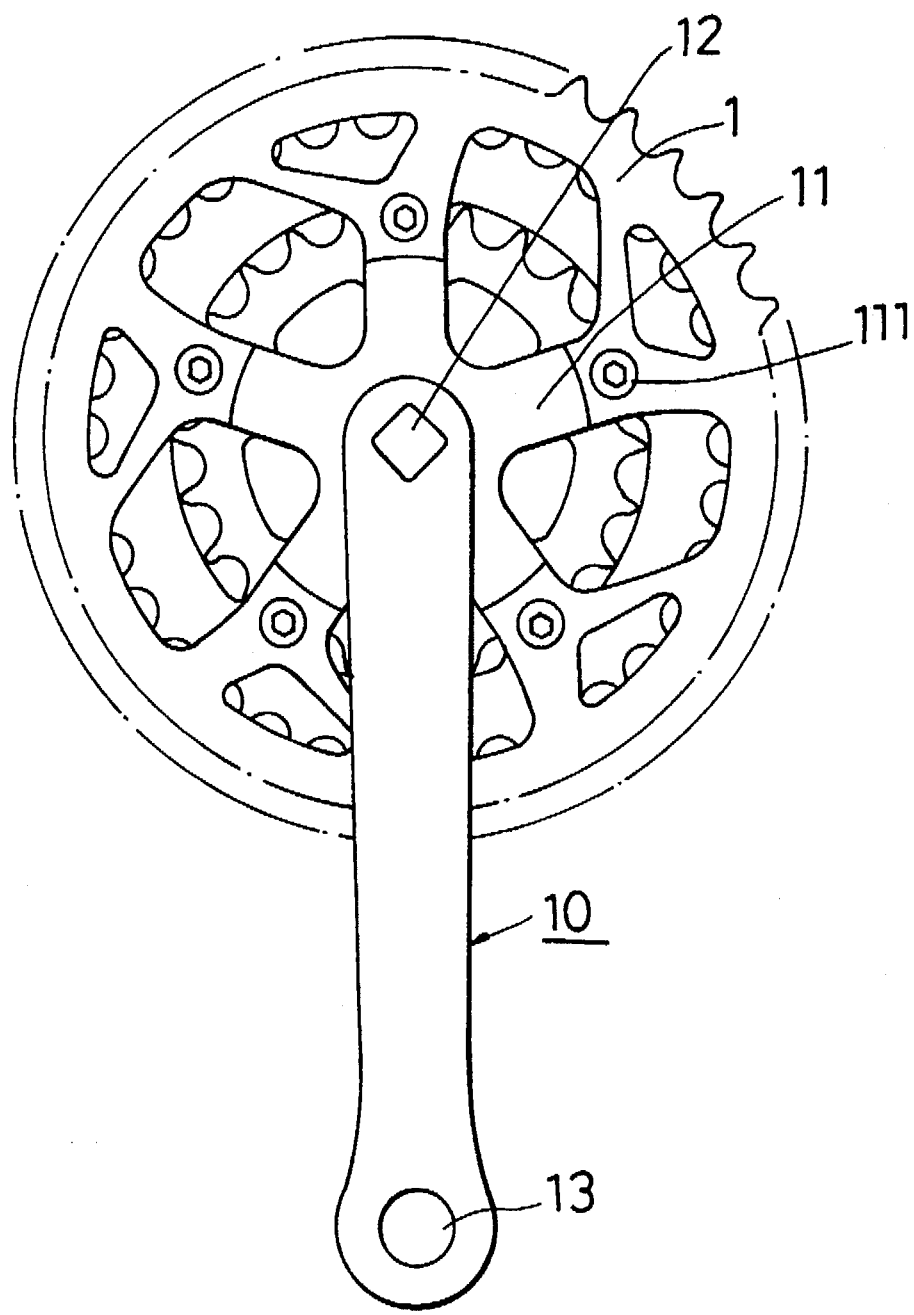
FIG. 1 illustrates a conventional crank assembly fixed on a bicycle sprocket.
Figure 2:
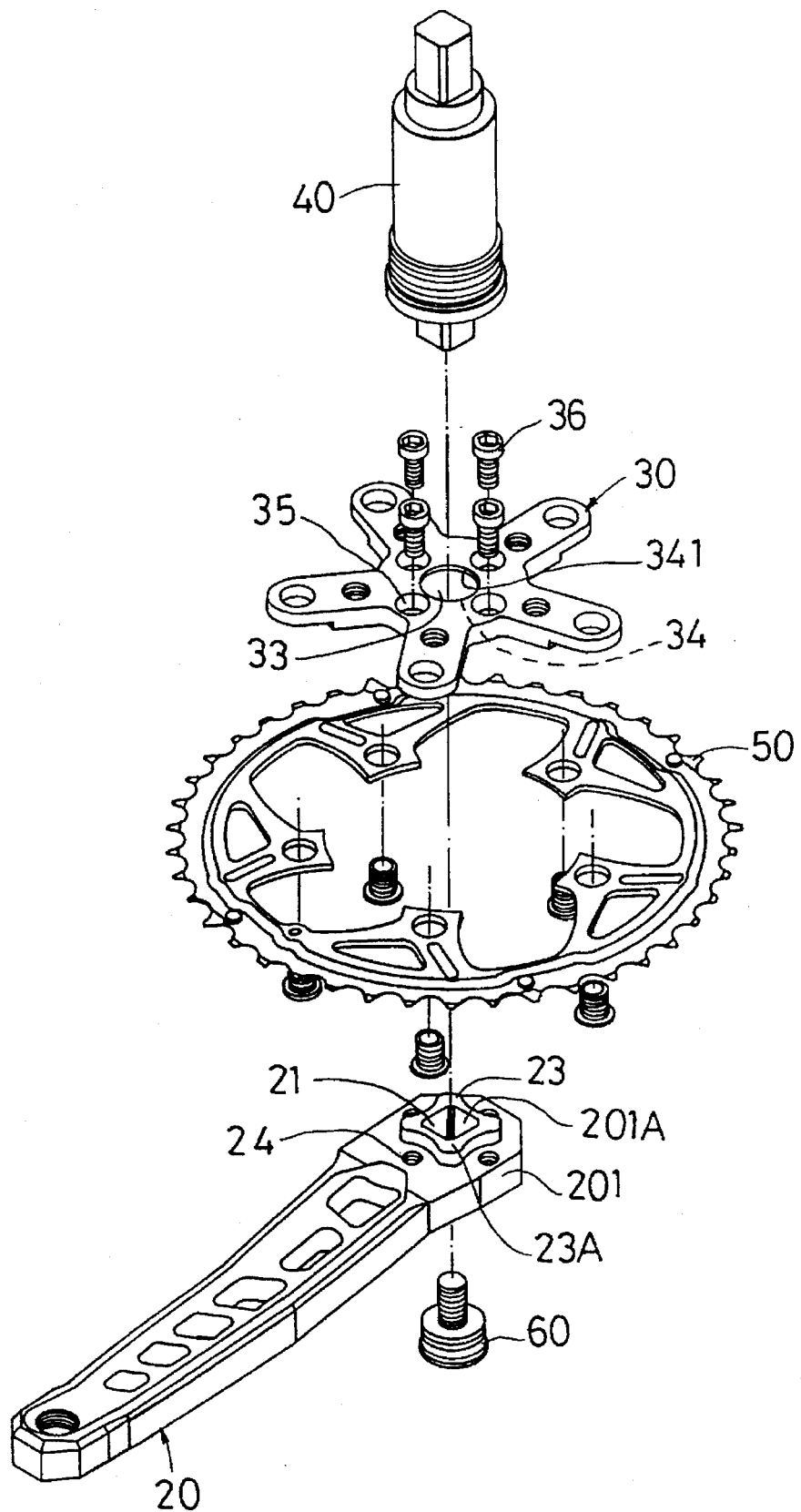
FIG. 2 is an exploded view of a crank assembly of the present invention.
Figure 3:
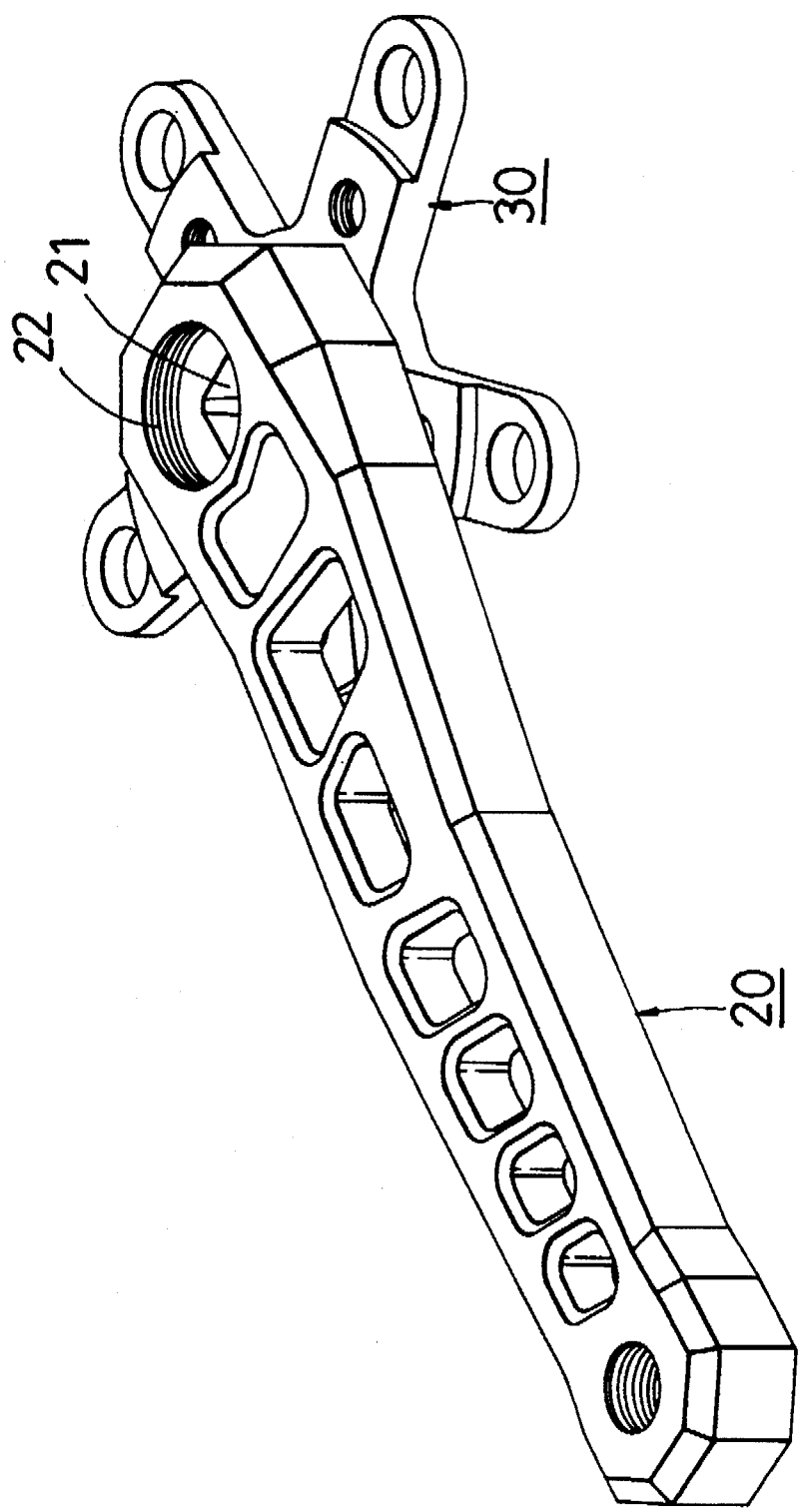
FIG. 3 is a perspective view of the crank assembly of FIG. 2.

Referring to FIGS. 2 and 3, a crank assembly for a bicycle includes an elongated crank arm 20 and a drive plate 30. The bicycle generally includes a sprocket 50 with a fixed rotating shaft 40 of a rectangular cross-section.

As illustrated, the drive plate 30 and the crank arm 20 are separately formed. The drive plate 30 is adapted to be fixed to the sprocket so as to achieve synchronous rotation therewith. The drive plate 30 has an internal peripheral wall 34 which defines a shaft hole 33 of a predetermined shape therein, an inward flange 341 which projects from the inner peripheral wall 34 into the shaft hole 33 in such a manner that the shaft of the sprocket can extend through the shaft hole 33 of the drive plate 30, and several angularly equidistant through-holes 35 formed through the drive plate 30 around the shaft hole 33.

The elongated crank arm 20 has an end portion 201 with a fastener hole 201A formed therethrough, an annular flange portion 23 which projects horizontally from a side surface of the end portion 201 and which has a vertical abutting face 23A that abuts on the inward flange 341 of the drive plate 30, and a rectangular receiving space 21 formed through the flange portion 23 so as to form a portion of the fastener hole 201A and so as to receive the shaft of the sprocket. The fastener hole 201A of the crank arm 20 further has an outer section 22 (see FIG. 3) which has a cross-section with a shape different from that of the rectangular receiving space 22. The crank arm 20 further has several threaded holes 24 formed in a surface of the end portion 201 around the flange portion 23.

Four locking bolts 36 extend through the through-holes 35 of the drive plate 30 to engage threadably the threaded holes 24 of the crank arm 20 so as to fasten together the drive plate 30 and the crank arm 20. After the crank assembly of the present invention has been mounted on the sprocket of the bicycle, the rotating shaft of the sprocket extends into the rectangular receiving space 21 of the flange portion 23 of the crank arm 20 through the shaft hole 33 of the drive plate 30 so as to engage threadably a threaded fastener 60 which is received within the outer section 22 of the fastener hole 201A of the crank arm 20, thereby securing the crank assembly of this invention to the sprocket in such a manner that the crank assembly rotates synchronously with the sprocket.

Since the drive plate and the crank arm of the crank assembly are separately formed, the crank assembly can be easily mounted on the sprocket of the bicycle. It is noted that the crank arm 20 and the drive plate 30 can be produced by machining so as to have smooth outer surfaces, thereby avoiding those drawbacks that generally result from the construction of the conventional crank assembly.

With the present invention thus explained, it is obvious to those skilled in the art that various modifications and variations can be made without departing from the scope and spirit thereof. It is therefore intended that the invention be limited only as in the appended claims.

I claim:

1. A crank assembly for a bicycle, the bicycle including a fixed rotating shaft of a rectangular cross-section and a sprocket mounted on said shaft, the crank assembly including a drive plate adapted to be fixed to the sprocket so as to achieve synchronous rotation of said drive plate and the sprocket, and an elongated crank arm which has an end portion connected securely to the drive plate, wherein the improvement comprises:

the elongated crank arm and the drive plate being separately formed, the drive plate having an internal peripheral wall the defines a shaft hole of a predetermined shape therein, an inward flange projecting from the inner peripheral wall into said shaft hole in such a manner that the shaft of said sprocket extends through said shaft hole of said drive plate, and several angularly equidistant through-holes formed through the drive plate around said shaft hole; and the crank arm having a fastener hole formed therethrough, an annular flange portion which projects horizontally from a side surface of an end portion thereof and which has a vertical abutting face that abuts on said inward flange of said drive plate, and a rectangular receiving space formed through said flange portion so as to form a portion of said fastener hold and so as to receive the shaft of the sprocket therein, said annular flange portion having the predetermined shape so as to be fitted within said shaft hole of said drive plate, said fastener hole of said crank arm further having an outer section which has a cross-section with a shape different from that of said rectangular receiving space, said crank arm further having several threaded holes formed in a surface of the end portion thereof around the flange portion; and several locking bolts extending through the through-holes of the drive plate to engage threadably within the threaded holes of the crank arm, thereby fastening together the drive plate and the crank arm;

whereby, the rotating shaft of the sprocket can extend into said rectangular receiving space of said inward flange portion of said crank arm through said shaft hole of said drive plate so as to engage threadably a threaded fastener which is received within the outer section of said fastener hole of said crank arm, thereby securing said crank assembly to the sprocket in such a manner that said crank assembly can rotate synchronously with the sprocket.

* * * * *